US011325442B2

(12) United States Patent
Cronin et al.

(10) Patent No.: US 11,325,442 B2
(45) Date of Patent: May 10, 2022

(54) METHOD FOR MONITORING THE QUALITY OF THE AIR IN A PASSENGER COMPARTMENT OF A VEHICLE

(71) Applicant: Ford Global Technologies, LLC, Dearborn, MI (US)

(72) Inventors: Ger Anthony Cronin, Pulheim (DE); Ingo Krolewski, Neuss (DE); Ulrike Sabrina Vogl, Cologne (DE); Paul Jamnicki, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 537 days.

(21) Appl. No.: 16/298,077

(22) Filed: Mar. 11, 2019

(65) Prior Publication Data

US 2019/0275856 A1   Sep. 12, 2019

(30) Foreign Application Priority Data

Mar. 12, 2018   (DE) .......................... 102018203662.4

(51) Int. Cl.
  *B60H 1/00*   (2006.01)
  *G01C 21/34*   (2006.01)
  *B60H 1/24*   (2006.01)

(52) U.S. Cl.
  CPC ......... *B60H 1/008* (2013.01); *B60H 1/00785* (2013.01); *B60H 1/247* (2013.01); *G01C 21/3461* (2013.01)

(58) Field of Classification Search
  CPC .... B60H 1/008; B60H 1/00785; B60H 1/247; G01C 21/3461
  See application file for complete search history.

(56) References Cited

U.S. PATENT DOCUMENTS

| 8,744,766 B2 | 6/2014 | Rakshit |
| 2009/0309744 A1 | 12/2009 | Fu et al. |
| 2012/0293315 A1 | 11/2012 | Schunder et al. |
| 2018/0041606 A1* | 2/2018 | Luo .................. G01D 21/00 |
| 2018/0281554 A1* | 10/2018 | Duan .................. B60W 40/02 |
| 2019/0077217 A1* | 3/2019 | Yu .................. B60H 1/00985 |
| 2019/0084369 A1* | 3/2019 | Duan .................. B60H 1/008 |

FOREIGN PATENT DOCUMENTS

| DE | 102015013596 A1 | 4/2016 |
| KR | 20120061414 A | 6/2012 |

* cited by examiner

*Primary Examiner* — Behrang Badii
(74) *Attorney, Agent, or Firm* — Vichit Chea; Price Heneveld LLP

(57) ABSTRACT

A vehicle and method are provided for monitoring and changing quality of air in a passenger compartment of a vehicle so that the air quality remains above a predeterminable threshold value. The vehicle has an air quality sensing device and an air quality changing device. The method includes sensing the quality of the air in the passenger compartment and in the surroundings of the vehicle with the air quality sensing device; and in the event that the quality of the air in the passenger compartment of the vehicle drops below the predeterminable threshold value, changing the quality of the air in the passenger compartment of the vehicle with the air quality changing device so that the quality of the air in the passenger compartment rises above the predeterminable threshold value.

16 Claims, 2 Drawing Sheets

METHOD FOR MONITORING THE QUALITY OF THE AIR IN A PASSENGER COMPARTMENT OF A VEHICLE

FIELD OF THE INVENTION

The present invention generally relates to a method for monitoring the quality of the air in a passenger compartment of a vehicle in such a manner that the air quality remains above a predeterminable threshold value and to a vehicle which is configured for carrying out the method.

BACKGROUND OF THE INVENTION

U.S. Patent Application Publication No. 2009/0309744 A1 discloses a system with which the air quality at a certain location can be ascertained in real time and made accessible via a network. DE 102015013596 A1, KR 20120061414 A and U.S. Pat. No. 8,744,766 B2 have navigation systems which, when a route leading to the input destination is determined, also take into consideration the air quality along the route and make recourse to systems as disclosed in U.S. Patent Application Publication No. 2009/0309744 A1. Thus, in addition to the quickest route, a route may also be proposed which leads through areas having particularly good air quality. In the event that the quickest route differs from the route with the best air quality, the vehicle driver may be able to choose between the routes.

It would be desirable to provide for a method with which it is possible to take a targeted measure for improving the quality of the air in the passenger compartment of the vehicle.

SUMMARY OF THE INVENTION

According to one aspect of the present invention, a method for monitoring and changing quality of air in a passenger compartment of a vehicle is provided. The method includes the steps of sensing the quality of the air in the passenger compartment and in one or more surroundings of the vehicle with an air quality sensing device located on the vehicle, and in the event that the quality of the air in the passenger compartment of the vehicle drops below the predeterminable threshold value, changing the quality of the air in the passenger compartment of the vehicle with an air quality changing device so that the quality of the air in the passenger compartment rises above a predeterminable threshold value.

According to another aspect of the present invention, a vehicle is provided. The vehicle includes an air quality sensing device for sensing the quality of the air in the passenger compartment and in one or more surroundings of the vehicle, and an air quality changing device for changing the quality of the air in the passenger compartment of the vehicle, wherein in the event that the quality of the air in the passenger compartment of the vehicle drops below the predeterminable threshold value, changing the quality of the air in the passenger compartment of the vehicle with the air quality changing device so that the quality of the air in the passenger compartment rises above the predeterminable threshold value.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1A:
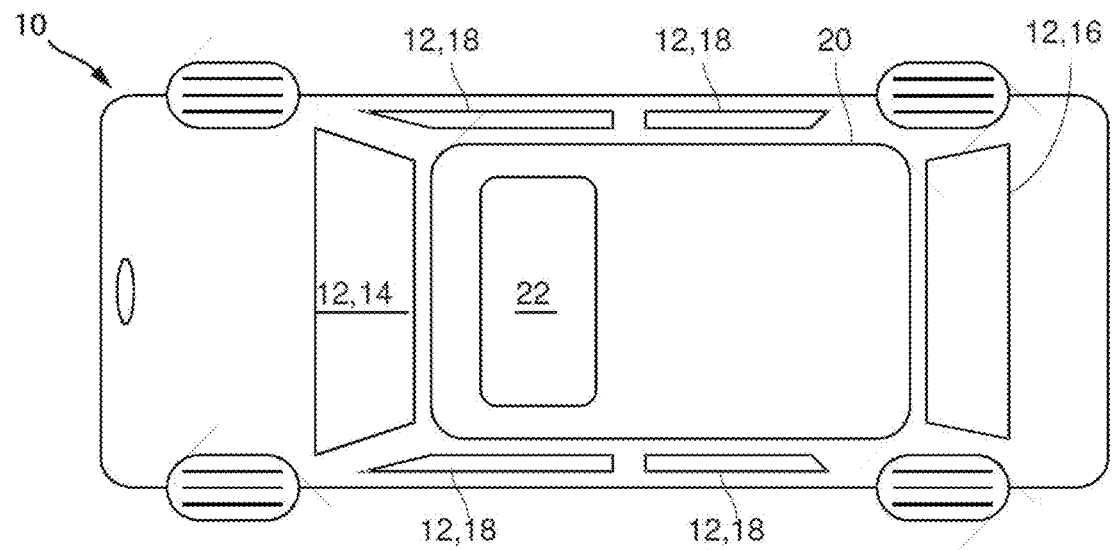
FIG. 1a is a schematic top view of a vehicle which can be operated with a method for monitoring quality of air in a passenger compartment of the vehicle, according to one embodiment.

A vehicle 10 is generally shown in FIG. 1a illustrated in a schematic top view. The vehicle 10 is configured in such a manner that the method according to one embodiment can be carried out. In the embodiment shown, the vehicle 10 has a total of six windows 12, namely a windshield 14, a rear window 16 and four side windows 18. The side windows 18 can be automatically lowered, with the window lifters necessary for this purpose and the driving source (e.g., motor) not being illustrated. In addition, the vehicle 10 comprises a vehicle roof 20 in which an automatically actuable sliding roof 22 is arranged, with the driving source also not being illustrated here.

Figure 1B:
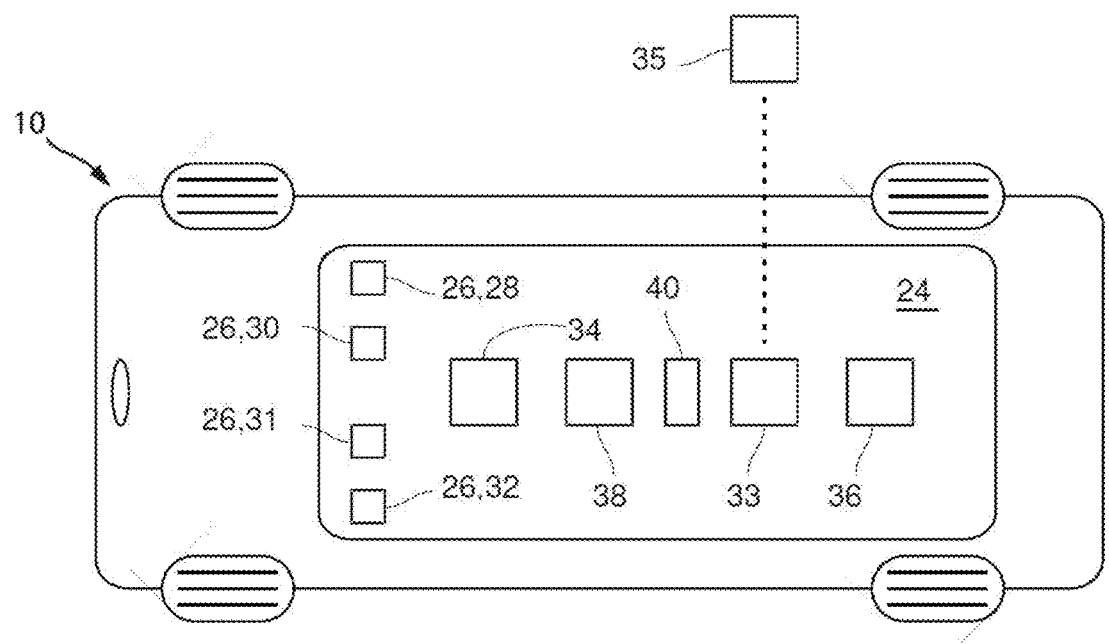
FIG. 1b is a schematic top view of the vehicle illustrated in FIG. 1a with components installed in the vehicle shown in blocks.

As can be seen from FIG. 1b, the vehicle 10 has a passenger compartment 24 which is bounded inter alia by the windows 12 and the vehicle roof 20. The vehicle 10 is equipped with an air quality sensing device 26 with which the quality of the air in the passenger compartment 24 of the vehicle 10 can be sensed and evaluated. For this purpose, the air quality sensing device 26 comprises a temperature sensor 28, a humidity sensor 30 and one or more pollutant sensors 31. The pollutant sensors 31 can ascertain, for example, the concentrations of carbon monoxide, carbon dioxide, nitrogen oxide, ozone, sulfur dioxide and/or fine dust. The quality of the air in the passenger compartment 24 can consequently be characterized and quantified in respect of the temperature, the air humidity and the pollutant concentration.

The temperature sensor 28, the humidity sensor 30 and the pollutant sensors 31 are configured in such a manner that they can not only characterize and quantify the quality of the air in the passenger compartment 24, but also in the surroundings of the vehicle 10. The air quality in the surroundings and also in areas further away from the vehicle 10 can also be ascertained with the aid of external systems 35. In order to be able to access the systems, the vehicle 10 has a communication device 33. In addition, the air quality sensing device 26 has a rain sensor 32 with which it can be determined whether and how strongly it is raining in the surroundings of the vehicle 10.

Furthermore, the vehicle 10 comprises an air quality changing device 34 which can be part of a control unit of the vehicle 10. In addition, the vehicle 10 comprises an air conditioning system 36. The air quality changing device 34 senses the measurement data generated by the air quality sensing device 26 and takes corresponding measures in order to change the quality of the air in the passenger compartment 24 in a targeted manner. Furthermore, the vehicle 10 has a navigation system 38 and a display device 40.

Figure 2:
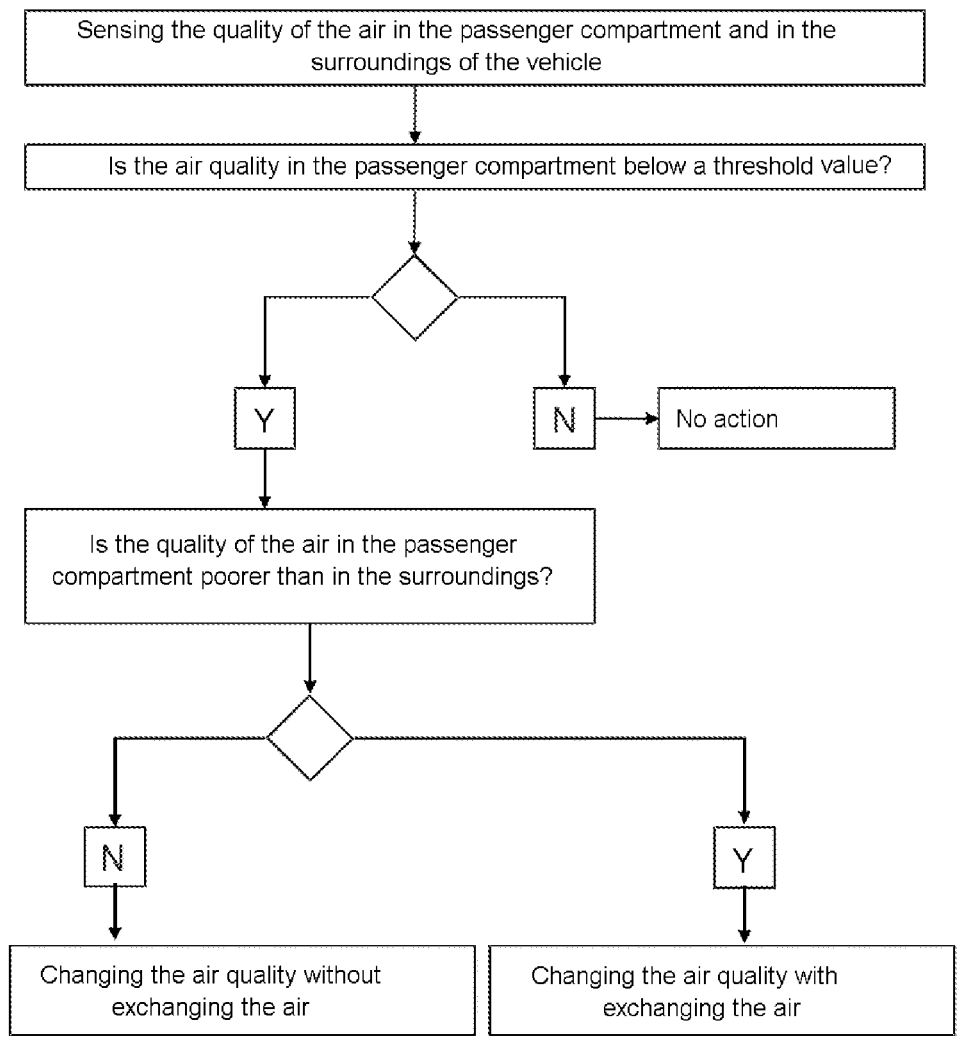
FIG. 2 is a flow diagram illustrating the method for monitoring quality of air in the passenger compartment of the vehicle, according to one embodiment.

FIG. 2 illustrates a sequence flow diagram of a method 100 for monitoring and changing air quality in the passenger compartment of the vehicle 10, according to one embodiment. The method 100 can be operated in the following manner: first of all at step 102, the quality of the air in the passenger compartment 24 and in the surroundings of the vehicle 10 is ascertained by use of the air quality sensing device 26. For this purpose, the air quality sensing device 26 makes use in particular of the temperature sensor 28, the humidity sensor 30 and the one or more pollutant sensors 31. The air quality sensing device 26 determines from the data supplied by the temperature sensor 28, by the humidity sensor 30 and by the pollutant sensors 31 whether the air quality in the passenger compartment 24 of the vehicle 10 lies or does not lie below a predetermined threshold value at step 104 and makes a decision at step 106. If this is not the case at step 110 and the air quality in the passenger compartment 24 lies above the threshold value, this is an indication that the air quality in the passenger compartment 24 of the vehicle 10 is sufficient and no action is taken at step 112. In the event that the air quality in the passenger compartment 24 of the vehicle 10 lies below the threshold value at step 108, this is an indication that the air quality in the passenger compartment 24 of the vehicle 10 is insufficient and measures have to be taken so that the air quality rises again above the threshold value.

In the event that the air quality in the passenger compartment 24 of the vehicle 10 lies below the threshold value at step 114, the air quality sensing device 26 emits a corresponding signal to the air quality changing device 34 which triggers the corresponding measures for increasing the air quality in the passenger compartment 24. According to the embodiment illustrated in FIG. 2, of the method 100, in the event that the air quality in the passenger compartment 24 lies below the threshold value, it is checked at step 116 whether the quality of the air in the passenger compartment 24 is better or worse than the air quality in the surroundings of the vehicle 10.

In the event that the quality of the air in the passenger compartment 24 lies below the threshold value and is poorer than the air quality in the surroundings of the vehicle 10 at step 120, the quality of the air in the passenger compartment 24 can be increased by an exchange of air with the surroundings of the vehicle 10 at step 122. For this purpose, the air quality changing device 34 can, for example, lower the windows 12, open the sliding roof 22, or, in the event that the vehicle 10 is a convertible, open the convertible top. Furthermore, air can be exchanged with a corresponding operation of the air conditioning system 36, wherein the air conditioning system 36 replaces a greater or lesser portion of the air in the passenger compartment 24 of the vehicle 10 for a corresponding portion of the air from the surroundings of the vehicle 10.

In the event that the quality of the air in the passenger compartment 24 is better than the quality of the air in the surroundings of the vehicle 10 at step 118, the quality of the air in the passenger compartment 24 cannot be increased by an exchange of the air from the surroundings of the vehicle 10 but instead is changed without exchange of the air from the surroundings at step 124. In this case, the air quality changing device 34 will operate the air conditioning system 36 in the recirculating air mode. Air conditioning systems 36 customarily have air filters which are capable of filtering certain components out of the air. For example, the filters can remove fine dust particles from the air. To this extent, the quality of the air in the passenger compartment 24 of the vehicle 10 can also be increased in the recirculating air mode of the air conditioning system 36.

Furthermore, the air conditioning system 36 is operated in such a manner that the temperature and the humidity of the air in the passenger compartment 24 of the vehicle 10 are changed in such a manner that the air quality rises again above the threshold value.

According to one embodiment, the method 100 may incorporate the navigation system 38. In this embodiment, when the route leading to the input destination is determined, the navigation system 38 also takes into consideration the quality of the air along the route. Furthermore, it is taken into consideration how far the quality of the air in the passenger compartment 24 of the vehicle 10 can be kept above the predetermined threshold value during the journey along the route. In the event that the quality of the air in the passenger compartment 24 of the vehicle 10 threatens to soon fall below the predetermined threshold value, it can be determined with the method 100 according to one embodiment how the quality of the air will develop along the route. To this extent, preventative measures can already be taken whenever the predetermined threshold value of the air in the passenger compartment 24 has not yet been fallen short of, but there is a concern that the quality of the air in the surroundings of the vehicle 10 will also soon fall below the threshold value. For example, the windows 12 can be lowered if the quality of the air in the surroundings of the vehicle 10 is still currently above the threshold value and is better than in the passenger compartment 24 of the vehicle 10. Consequently, the quality of the air in the passenger compartment 24 and in the surroundings of the vehicle 10 is equalized by an exchange of air, and therefore it is possible to travel along the upcoming portion of the route in which the air quality lies below the threshold value with closed windows 12 without the quality of the air in the passenger compartment 24 of the vehicle 10 dropping below the threshold value.

With the display device 40, the quality of the air in the passenger compartment 24 and in the surroundings of the vehicle 10 can be displayed in the form of bar diagrams or in the form of videos. The driver and the remaining occupants of the vehicle 10 are informed about the currently prevailing air quality. Furthermore, the display device 40 can provide an indication that certain measures will be taken in order to improve the quality of the air in the passenger compartment 24 of the vehicle 10. For example, an indication can be issued that the windows 12 will be lowered, and therefore the occupants of the vehicle 10 will not be surprised by this measure and possibly misconstrue the same. Furthermore, videos can be shown which provide the occupants with assistance in the operation of the air conditioning system 36 and the maintenance thereof. For example, an indication can be provided by the display device 40 that the filter should be replaced in order to be able to increase the quality of the air in the passenger compartment 24 even in the recirculating air mode of the air conditioning system 36.

An embodiment of the disclosure relates to a method for monitoring the quality of the air in a passenger compartment of a vehicle in such a manner that the air quality remains above a predeterminable threshold value or exceeds the latter again, wherein the vehicle has an air quality sensing device for sensing the quality of the air in the passenger compartment and in the surroundings of the vehicle, and an air quality changing device for changing the quality of the air in the passenger compartment of the vehicle. The method comprises the following steps: sensing the quality of the air in the passenger compartment and in the surroundings of the vehicle by use of the air quality sensing device; and in the event that the quality of the air in the passenger compartment of the vehicle drops below a predeterminable threshold value, changing the quality of the air in the passenger compartment of the vehicle by use of the air quality changing device in such a manner that the quality of the air in the passenger compartment rises above the predeterminable threshold value.

The vehicle according to the proposal disclosed herein has an air quality sensing device which is capable of determining the quality of the air both in the vehicle and in the surroundings of the vehicle. For this purpose, the vehicle can have corresponding sensors which are arranged in the passenger compartment of the vehicle and outside the passenger compartment, for example in the bumpers of the vehicle. Many vehicles have temperature sensors which can firstly ascertain the temperature in the passenger compartment of the vehicle and secondly the temperature in the surroundings of the vehicle. However, the air quality sensing device does not inevitably have to make recourse entirely or partially to sensors installed in the vehicle in order to ascertain the quality of the air in the surroundings of the vehicle. To the contrary, it can also make recourse to external data sources which are provided, for example, by systems which are disclosed in U.S. Patent Application Publication No. 2009/0309744 A1, for example. For this purpose, the air quality sensing device interacts with a correspondingly designed communication device in order to be able to make recourse to the data provided by systems of this type.

With the aid of the method according to the disclosure, it is possible to compare the quality of the air in the surroundings of the vehicle with that in the passenger compartment of the vehicle. In the event that the air quality in the passenger compartment of the vehicle falls below a certain threshold value which can be defined by the manufacturer or by the owner of the vehicle, the air quality in the passenger compartment of the vehicle is changed and influenced by use of the air quality changing device in such a manner that the air quality rises again above the threshold value. As explained in more detail later, the measures which can be taken by the air quality changing device for improving the air quality in the passenger compartment of the vehicle can be divided into measures which exchange the air with the surroundings and which prepare the air without exchange. Consequently, it is ensured that the air quality in the passenger compartment of the vehicle falls below the threshold value only for a short time, if at all. The negative consequences, which were explained at the beginning, of too poor an air quality on people, for example respiratory tract disorders, fatigue or even loss of consciousness, are kept away from the occupants of the vehicle and in particular from the driver with the aid of the method. Not only is the car journey more pleasant for the occupants, but a contribution is also made to improving road safety.

According to a further embodiment, the vehicle comprises an air conditioning system, wherein the step of changing the quality of the air in the passenger compartment of the vehicle comprises activating the air conditioning system by use of the air quality changing device in such a manner that the quality of the air in the passenger compartment rises above the predeterminable threshold value. A multiplicity of modern vehicles have an air conditioning system with which the temperature of the air in the passenger compartment of the vehicle can be changed. A greater or lesser portion of the air in the passenger compartment of the vehicle is exchanged here for air from the surroundings of the vehicle. In the event that, for example, the concentration of carbon dioxide in the passenger compartment of the vehicle is higher than in the surroundings of the vehicle, it can be ensured, by corresponding activation of the air conditioning system, that the concentration of carbon dioxide in the passenger compartment of the vehicle drops and therefore the quality of the air in the passenger compartment rises.

In a further developed embodiment, the air conditioning system can be operated in the recirculating air mode. In the event that the air quality in the surroundings of the vehicle is poorer than in the passenger compartment of the vehicle, the air conditioning system can be operated in the recirculating air mode, and therefore no air enters from the surroundings of the vehicle into the passenger compartment of the vehicle. This prevents a deterioration in the quality of the air in the passenger compartment of the vehicle. Air conditioning systems customarily have air filters which are capable of filtering certain components out of the air. For example, the filters can remove fine dust particles from the air. To this extent, the quality of the air in the passenger compartment of the vehicle can also be increased in the recirculating air mode of the air conditioning system.

In a further developed embodiment, the vehicle can have automatically lowerable windows and/or an automatically actuable sliding roof, and the step of changing the quality of the air in the passenger compartment of the vehicle can comprise an activation of the windows and/or of the sliding roof by use of the air quality changing device in such a manner that the quality of the air in the passenger compartment rises above the predeterminable threshold value. In the event that the quality of the air in the passenger compartment of the vehicle drops below the threshold value, but the quality of the air in the surroundings of the vehicle is better than in the passenger compartment, the quality of the air in the passenger compartment of the vehicle can be improved by lowering the windows or by opening the sliding roof.

In a further embodiment, the air quality sensing device can comprise a temperature sensor, a humidity sensor, a number of pollutant sensors and/or a rain sensor, the measurement data of which sensors are taken into consideration in the sensing of the quality of the air of the passenger compartment and/or in the surroundings of the vehicle. The pollutant sensors can ascertain, for example, the concentrations of carbon monoxide, carbon dioxide, nitrogen oxide, ozone, sulfur dioxide and/or fine dust, with the list not being definitive.

Modern vehicles typically have a temperature sensor with which the temperature of the air in the passenger compartment and in the surroundings of the vehicle can be ascertained. In the event that the air quality both in the passenger compartment and in the surroundings of the vehicle lies below the threshold value and, consequently, the quality of the air in the passenger compartment of the vehicle cannot be improved by an exchange of air, a reduction in the temperature in the passenger compartment of the vehicle can mitigate respiratory tract disorders, for example, or can at least reduce the fatigue brought about by an increased concentration of carbon dioxide. The same applies to the air humidity in the passenger compartment of the vehicle. The humidity sensor can also be used for preventing an imminent misting of the windows of the vehicle, by corresponding activation of the air conditioning system or by lowering of the windows. With the sensors mentioned, the quality of the air both in the passenger compartment and in the surroundings of the vehicle can be readily ascertained and it can be determined whether the quality lies above or below the predeterminable threshold value.

As already mentioned, the quality of the air in the passenger compartment of the vehicle can be improved by the fact that the windows are lowered and/or the sliding roof is opened. The rain sensor has the effect here that these measures are not carried out during rain. WO2014/059218 A1 discloses further sensors and variables which are measured by them and which can be taken into consideration in ascertaining the air quality.

A developed embodiment is distinguished in that the vehicle has a navigation system which, when a route leading to the input destination is determined, takes into consideration the quality of the air along the route. As already mentioned, DE 102015013596 A1, KR 20120061414A and U.S. Pat. No. 8,744,766 B2 disclose navigation systems which, when the route leading to the input destination is determined, also take into consideration the quality of the air along the route. The navigation system in this embodiment carries out the same, with it also being possible to take into consideration here the extent to which the quality of the air in the passenger compartment of the vehicle can be kept above the predetermined threshold value along the route. In the event that the quality of the air in the passenger compartment of the vehicle threatens to soon fall below the predetermined threshold value, it can be determined with the method, according to one embodiment how the quality of the air along the route will develop. To this extent, preventative measures can then already be taken whenever the predetermined threshold value in the passenger compartment has not yet been fallen short of, but there is the concern that the quality of the air in the surroundings of the vehicle will also shortly fall below the threshold value. For example, the windows can be lowered if the quality of the air in the surroundings of the vehicle still currently lies above the threshold value and is better than in the passenger compartment of the vehicle. Consequently, the quality of the air in the passenger compartment and in the surroundings of the vehicle equalizes, and therefore it is possible to drive through the upcoming portion of the route in which the air quality lies below the threshold value with closed windows without the quality of the air in the passenger compartment of the vehicle lying below the threshold value. To this extent, the quality of the air in the passenger compartment of the vehicle can be actively changed, and therefore the threshold value along the route is not fallen short of.

According to a further embodiment, the vehicle has a display device which graphically illustrates the sensed quality of the air in the passenger compartment and in the surroundings of the vehicle. The graphical illustration of the quality of the air in the passenger compartment and in the surroundings of the vehicle can be realized in the form of bar diagrams or in the form of videos. The driver and the other occupants of the vehicle are informed about the currently prevailing air quality. Furthermore, the display device can give an indication that certain measures will be taken in order to improve the quality of the air in the passenger compartment of the vehicle. For example, an indication can be issued to the effect that the windows will be lowered, and therefore the occupants of the vehicle will not be surprised by the measure and possibly misconstrue the same.

Additionally, a development of the disclosure relates to a computer program product for carrying out a method according to one of the preceding embodiments. Furthermore, a refinement of the disclosure relates to a vehicle, in particular a motor vehicle, which is configured for carrying out a method according to one of the preceding embodiments.

The technical effects and advantages which can be achieved with the computer program product according to the proposal and with the present vehicle correspond to those which have been explained for the present method. In summary, it should be pointed out that it is possible with the computer program product and the vehicle to ascertain the quality of the air both in the passenger compartment and in the surroundings of the vehicle and to take measures to prevent the quality of the air in the passenger compartment of the vehicle from dropping below a predeterminable threshold value. As a result, the car journey may become more pleasant for the occupants and, furthermore, for example, fatigue which is increased as a result of an increased concentration of carbon dioxide or even a loss of consciousness of the driver can be prevented, and therefore a contribution is made to road safety.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for monitoring and changing quality of air in a passenger compartment of a vehicle, comprises the steps of:
   sensing the quality of the air in the passenger compartment and in one or more surroundings of the vehicle with an air quality sensing device located on the vehicle, wherein the air quality sensing device comprises at least a temperature sensor, a humidity sensor, and a plurality of pollutant sensors; and
   in the event that the quality of the air in the passenger compartment of the vehicle drops below the predeterminable threshold value, changing the quality of the air in the passenger compartment of the vehicle with an air quality changing device so that the quality of the air in the passenger compartment rises above a predeterminable threshold value, wherein the air quality changing device changes the air quality by exchanging the air within the passenger compartment when the quality of the air in the passenger compartment is poorer than the quality of air in the one or more surroundings of the vehicle, and wherein the air quality changing device changes the air quality without exchanging the air within the passenger compartment when the quality of the air in the passenger compartment is not poorer than in the one or more surroundings of the vehicle.

2. The method as claimed in claim 1, wherein the vehicle comprises an air conditioning system, and the step of changing the quality of the air in the passenger compartment of the vehicle comprises activating the air conditioning system with the air quality changing device in such a manner that the quality of the air in the passenger compartment rises above the predeterminable threshold value.

3. The method as claimed in claim 2, wherein the air conditioning system is operated in the recirculating air mode.

4. The method as claimed in claim 1, wherein the vehicle has automatically lowerable windows and/or an automatically actuable sliding roof, and the step of changing the quality of the air in the passenger compartment of the vehicle comprises activating the windows and/or the sliding roof with the air quality changing device in such a manner that the quality of the air in the passenger compartment rises above the predeterminable threshold value.

5. The method as claimed in claim 1, wherein the air quality sensing device further comprises a rain sensor, the measurement data of which sensors are taken into consideration in the sensing of the quality of the air of the passenger compartment and/or in the surroundings of the vehicle.

6. The method as claimed in claim 1, wherein the vehicle has a navigation system which, when a route leading to the input destination is determined, takes into consideration the quality of the air along the route.

7. The method as claimed in claim 1, wherein the vehicle has a display device which graphically illustrates the sensed quality of the air in the passenger compartment and in the surroundings of the vehicle.

8. The method as claimed in claim 1, wherein the method is carried out by a computer program product.

9. The method as claimed in claim 1, wherein the vehicle comprises a motor vehicle.

10. A vehicle comprising:
   an air quality sensing device for sensing the quality of the air in the passenger compartment and in one or more surroundings of the vehicle, wherein the air quality sensing device comprises at least a temperature sensor, a humidity sensor, and a plurality of pollutant sensors; and
   an air quality changing device for changing the quality of the air in the passenger compartment of the vehicle, wherein in the event that the quality of the air in the passenger compartment of the vehicle drops below the predeterminable threshold value, changing the quality of the air in the passenger compartment of the vehicle with the air quality changing device so that the quality of the air in the passenger compartment rises above the predeterminable threshold value, wherein the air quality changing device changes the air quality by exchanging the air within the passenger compartment when the quality of the air in the passenger compartment is poorer than the quality of air in the one or more surroundings of the vehicle, and wherein the air quality changing device changes the air quality without exchanging the air within the passenger compartment when the quality of the air in the passenger compartment is not poorer than in the one or more surroundings of the vehicle.

11. The vehicle as claimed in claim 10 further comprising an air conditioning system, and the step of changing the quality of the air in the passenger compartment of the vehicle comprises activating the air conditioning system with the air quality changing device in such a manner that the quality of the air in the passenger compartment rises above the predeterminable threshold value.

12. The vehicle as claimed in claim 11, wherein the air conditioning system is operated in the recirculating air mode.

13. The vehicle as claimed in claim 10 further comprising automatically lowerable windows and/or an automatically actuable sliding roof, and the step of changing the quality of the air in the passenger compartment of the vehicle comprises activating the windows and/or the sliding roof with the air quality changing device in such a manner that the quality of the air in the passenger compartment rises above the predeterminable threshold value.

14. The vehicle as claimed in claim 10, wherein the air quality sensing device further comprises a rain sensor, the measurement data of which sensors are taken into consideration in the sensing of the quality of the air of the passenger compartment and/or in the surroundings of the vehicle.

15. The vehicle as claimed in claim 10 further comprising a navigation system which, when a route leading to the input destination is determined, takes into consideration the quality of the air along the route.

16. The vehicle as claimed in claim 10 further comprising a display device which graphically illustrates the sensed quality of the air in the passenger compartment and in the surroundings of the vehicle.

* * * * *